T. RHOADES.
MOTOR SLEIGH.
APPLICATION FILED AUG. 6, 1921.
1,409,408.
Patented Mar. 14, 1922.
3 SHEETS—SHEET 2.
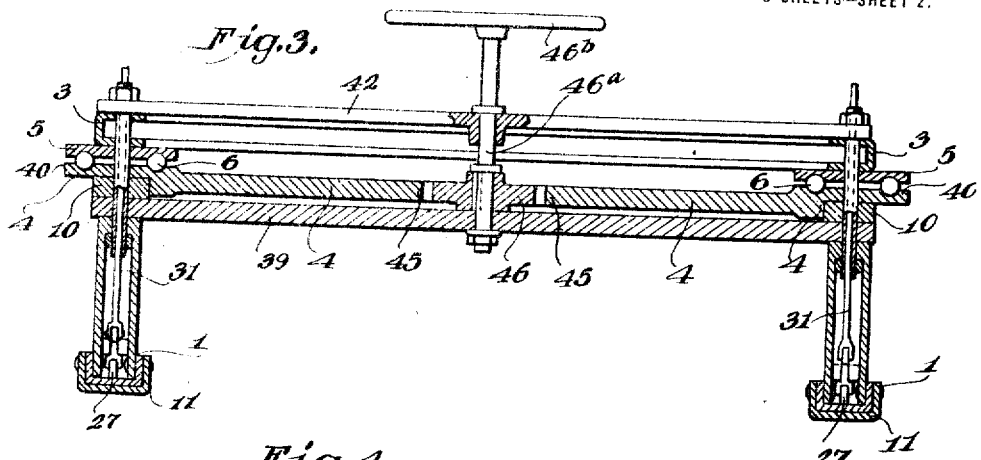
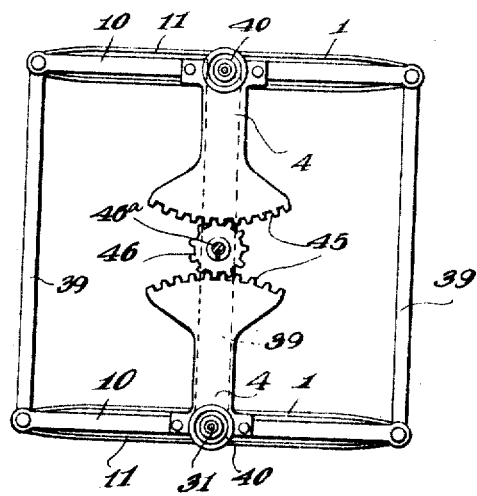
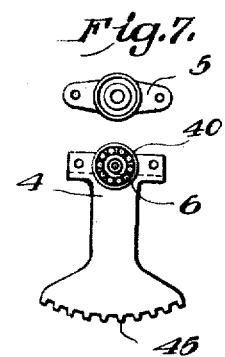
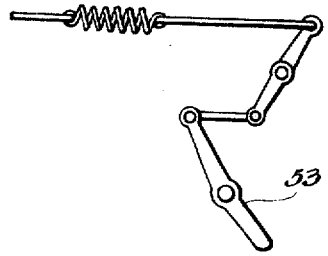
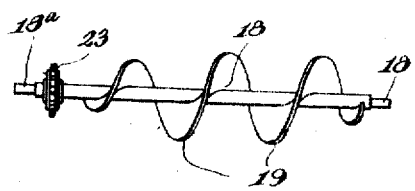
INVENTOR
Thomas Rhoades
BY
Fred G. Dieterich
ATTORNEYS

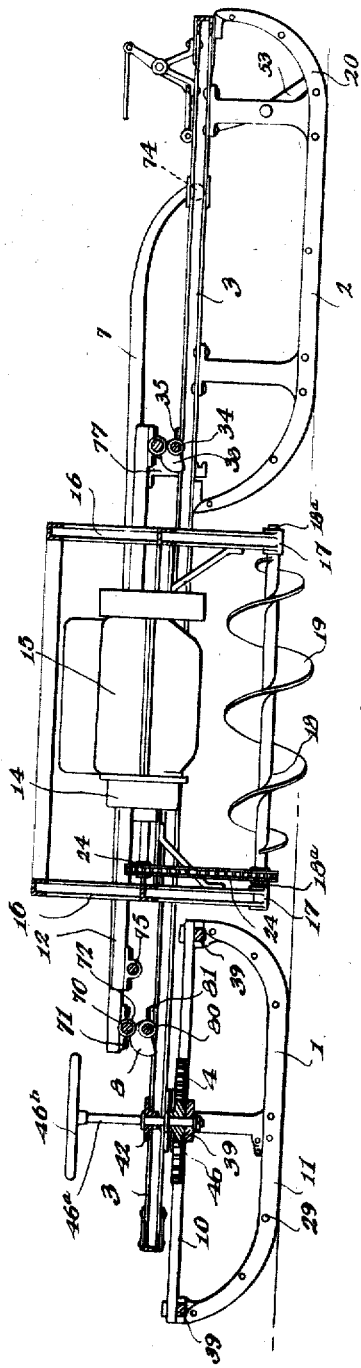

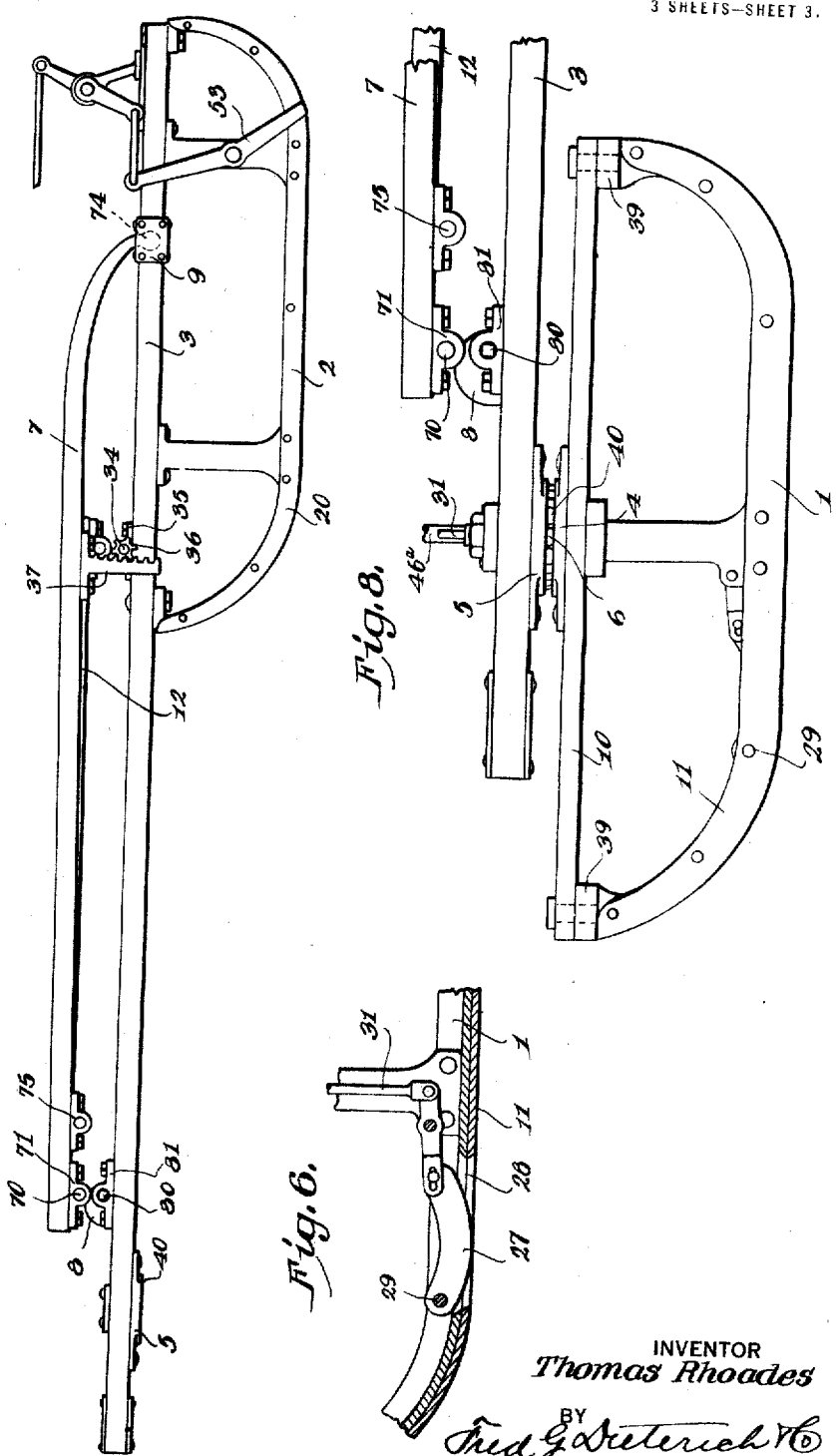

UNITED STATES PATENT OFFICE.

THOMAS RHOADES, OF HANNA, UTAH, ASSIGNOR OF ONE-FOURTH TO THOMAS WILLIAM RHOADES AND ONE-FOURTH TO FRANK CHIARELLI, BOTH OF HANNA, UTAH.

MOTOR SLEIGH.

1,409,408.     Specification of Letters Patent.     Patented Mar. 14, 1922.

Application filed August 6, 1921. Serial No. 490,242.

*To all whom it may concern:*

Be it known that I, THOMAS RHOADES, a citizen of the United States, residing at Hanna, in the county of Duchesne and State of Utah, have invented a new and useful Motor Sleigh, of which the following is a specification.

This invention has reference to improvements in that class of automobile vehicles in which the propelling elements are particularly designed for driving the vehicle over snow and ice, and primarily my invention has for its purpose to provide a vehicle of the general character stated in which the fore and aft sleds or runner frames have connecting parts combined with means for readily adjusting the said parts to suit the conditions under which the vehicle may be traveling and in which the several parts are individually so designed and adapted to co-operate with one another so they may be constructed at a relatively low cost and the adjusting of the driving mechanism and the gradual stopping of the running of the vehicle may be conveniently and effectively accomplished by the occupant of the vehicle.

Another object of my invention is to provide a motor sleigh of that type whose traction elements are in the nature of cylindrical cores or drums having helical projections or tread flanges that cause the vehicle to advance as power is applied to the said cores or drums from a motor engine mounted upon the vehicle.

Again, my invention comprehends, in a motor sleigh of the general type referred to, simple and easily applied means for conveniently raising and lowering the traction elements or propellers at various heights to suit the character of the surface over which the sleigh may be traveling.

Furthermore, my invention seeks to provide, in a motor vehicle of the kind mentioned, an improved construction of propeller in which the traction or helical ribs are especially designed for clearing themselves as they cut through the snow, to prevent clogging or batting up the said traction elements.

With the above and other objects in view, that will be hereinafter apparent and incidentally referred to, my invention comprehends an improved motor sleigh that embodies the peculiar features of construction and arrangement of parts, all of which will be fully explained in the following detailed description, specifically stated in the appended claims and illustrated in the accompanying drawings, in which:—

Figure 1 is a longitudinal section of a motor sleigh constructed in accordance with my invention and taken particularly on the line 1—1 on Figure 2.

Figure 2 is a top plan thereof.

Figure 3 is a transverse section taken on the line 3—3 on Figure 2 and looking in the direction of the arrow.

Figure 4 is a top plan view of the front runner or sled member, the front end of the main frame and the cooperating ends of the vertically adjustable and motor mechanism carrying frame, being omitted to more clearly illustrate the steering mechanism.

Figure 5 is a diagrammatic side elevation of the main frame, the vertically swingable frame that pivotally joins with the rear runner or sled member, the supplemental or power mechanism supporting frame and simultaneous vertical adjustment of the supplemental frame.

Figure 6 is a detail view that illustrates one of the anti-skid devices mounted on the front runner and hereinafter referred to.

Figure 7 is a plan view of one of the fan shaped oscillatable gear segments that constitutes part of the steering mechanism, the cap member that fits over the ball bearing socket thereof being also illustrated.

Figure 8 is a detail side elevation of the front runner, the front end of one of the side bars that hinge to the rear runner, the hinged end of the supplemental or power mechanism carrying frame, and one of the snail shaped cam devices mounted on the main frame bar and its cooperating roller bearing on the hinge frame bar.

Figure 9 is a plan view of one of the rotary propeller drums.

Figure 10 is a detail side elevation of a brake device that is mounted on the rear runner and is hereinafter specifically referred to.

In the practical development of my motor sleigh the body of the sleigh includes front and rear runners or sled members designated 1 and 2, the front sled having top bars 10—10 one for each runner 11—11 whose front and rear ends are fixedly connected to the said top bars in any suitable manner.

The rear sled member consists of a pair of runners 20—20 the opposite ends of which curve up to a common horizontal plane, and it will be noticed from the drawings the front end of the fore and aft runners, have a longer curvature than the rear ends thereof, the reason for which is explained as follows.

When traveling ahead, the sleigh when breaking a new road needs a longer slope to the runner at the front than it does at the back, since the back curve of the runner is only utilized in backing when the road is always broken. By having the longer curve at the front end it facilitates breaking a new road through the soft snow as it provides for coming forward with the sled with greater speed.

The rear sled member 2 has its runners 20 fixedly attached to a pair of side bars that are hereinafter termed "the main frame bars 3—3." The said main frame bars 3—3 extend forwardly, bridge the gap between the front and rear sleds and are loosely supported upon the top bars 10—10 of the front sled, the said bars 10—10 each having a fulcrum connection with the main frame bars 3 through bearing sockets 40 that constitute parts of the segmental gear members 4, presently further explained, and one of which is fixedly attached to each top bar 10 midway its length.

5—5 designate cap members that are fixedly secured on the under side of the forward ends of the bar 3 and which engage the ball bearings 6 in the bearing sockets 40, when the parts are assembled for use.

7—7 denote opposite side bars that constitute a swinging frame, and each of the said bars is disposed along its adjacent side of the front and rear sleds. The front ends of the said bars are joined by a cross shaft 70 which journals in bearings 71—71 on the under side of the front ends of such bars 7, and the front end of each of the side bars has an attached pendent block 71 in which is mounted a roller bearing 72 adapted for engaging a snail shaped adjusting cam 8, as is best shown in Figure 1.

The rear end of each bar 7 of the swinging frame curves inwardly and carries a ball head 74, and the said ball head engages socket bearings 9 fixedly attached to the upper side of the opposite bars 3—3 of the runners 2—2 as is clearly shown in Figures 1 and 2.

A third or supplemental frame, which is hereinafter termed the power mechanism carrying frame, cooperates with the main and swinging frames and it consists of two opposite side bars 12—12 whose forward ends are hinged to bearing blocks 75, of which there is one located near the extreme forward end of each of the bars 7, and the said frame members 12—12 sustaining a vertical framing 16—16 which, in practice, is arranged for supporting the motor engine 14 and the power transmission, diagrammatically indicated at 14 and 15 since, in practice, the particular form of engine and the power transmission may be varied and arranged to suit the conditions required for transmitting power to the rotary propellers or tractor elements hereinafter specifically referred to.

The power mechanism carrying frame, before mentioned, includes a pair of opposite and longitudinally positioned uprights 16—16, the lower end of each of which is provided with a horizontal sleeve 17. The said sleeves constitute bearings for the shaft ends $18^a$ of the propeller or traction elements, the construction of which is best shown in Figure 9, it being understood one of the said propelling devices is located at each of the opposite sides of the machine so as to utilize the mechanism supporting frame and for holding the machine to travel straight ahead when the front and rear sled runners are held in vertical longitudinal alignment.

As the construction of the two oppositely disposed propellers is alike, a detailed description of one of such propellers or traction elements will suffice for both.

The propeller consists of an auger shaped body 18, whose opposite ends taper, the taper of the forward end being more gradual than that of the rear end so as to facilitate the entrance of the propeller into soft snow.

The propeller body is equipped with an auger shaped or helical radially projected rib or traction flange 19 with the flange 19 on the opposite propellers, arranged as right and left threads (see Figure 2) so as to make the traction pull straight, which would not be the case if the tractor flanges were in the same direction on both propeller cores or drums.

The shafts $18^a$ on the propeller bodies each have a driving gear 23 to which motion is applied through a transmission chain 24 that takes over the opposite gears 23—23 on the two propeller shafts and a drive gear $24^a$ on the motor or engine driving shaft, as shown in Figures 2 and 3.

The steering devices, hereinafter referred to, consist of the two oppositely disposed gear segments 45—45 that are fulcrumed on their respective top bars 10 of the front runners and a central gear 46 that is located between the opposing gear edges of the segments 45—45 and which is mounted on a crank actuated shaft $46^a$ that journals in the arch or cross frame portion 42 of the main frame 3, it being understood, that by turning the wheel $46^b$ in the desired direction, the front runner can be readily guided to the right or to the left, the rear runner, owing to the main frame bars which are fixedly attached thereto, being fulcrumed at their front end on the top bars 10—10 of the front runner, the rear sled or runner will travel along in the same direction with the front sled or runner.

27—27 designate a pair of anti-skid or brake shoes, one of which is applied to each front sled runner, and each of the said shoe members 27 is formed of a substantially crescent shaped metal plate that has vertical movement within a longitudinal slot 28 in the runner to which it is applied and to which its front end is pivoted as indicated at 29.

The rear end of each of the anti-skid members 27 is attached to a lifting rod 31 whose upper end projects above the sled frame in convenient reach of the operator that controls the steering wheel, and to provide against friction of the anti-skid adjusting means with the snow as the sled is drawn along, the rods 31 are passed up through the tubular clamping rods that hold the sled members and their attached frames together, as is clearly indicated in Figure 3.

The members 27 are used to prevent skidding when the sleigh is running on ice or crossing roads.

As before noted, the hinged frame supports the supplemental power mechanism supporting frame and to provide for quickly setting the hinge frame whereby to adjust the traction functions of the propellers the small shaped cam devices 8, heretofore mentioned are provided.

There are two cam devices 8 and they are rigidly attached to a cross shaft 80 that is journaled in suitable bearings 81 on the forward end of the main frame bars 3—3 and the said cams 8 are so located along the shaft 80 that the ball bearings on the under side of the outer ends of the hinge bar 7 normally rest thereon, as is clearly shown in Figure 1.

By providing the cam devices for engaging the swinging bars 7—7, as shown, it is obvious that by applying a suitable crank to one end of the shaft 80 the cams 8 can be turned to raise and lower the swinging frame bars 7—7 at will, and since the supplemental frame that supports the power mechanism is mounted on the bars of the supplemental frame it follows that in raising and lowering the bars 7—7 the frame that carries the propellers is likewise raised and lowered.

To keep the supplemental frame on a level with the main frame bars 3—3 and consequent uniform tractive connection along the full length of the propellers when they are at their operative or propelling adjustment, or when lifted out of tractive connection with the surfaces over which the sleigh may be traveling, automatically operating means is provided for raising or lowering the front or free end of the supplemental arm as its rear or hinge portion is being raised or lowered by actuating the snail shaped cams 8, as before stated.

To such end, a cross rod 34 is journaled in suitable bearings 35—35 on the under face of the free ends of the frame bars 12—12 of the said supplemental arm. Each end of the rod 34 carries a spur wheel 36 and each spur wheel meshes with a segmental rack 37 fixedly attached to their respective swinging bars 7 and the rod 34 also carries a pair of snail shaped cams 38—38 upon which rest the ball bearing equipped ends of the hinge side bars of the supplemental frame, as shown.

It will be apparent by referring to Figure 1, due to the connection of the outer ends of the supplemental frame arms with the swinging arms 7—7, as stated and shown, that as the said arms 7—7 are raised by suitable turning of the shaft 80 that carries the cams 8 the front ends of the arms 7—7 will be lifted and since the rear end of the supplemental frame is hingedly connected with the said arms 7—7 at the front ends thereof it follows that that end of the said supplemental frame is raised up with the arms 7—7 and as the said arms 7—7 are elevated, as stated, their movement automatically effects the adjustment of the rear or free end of the supplemental frame since the segment racks 37—37 meshing with the coengaging spur wheels 36—36 will turn the rod 34 with the cams 38 and thereby cause the said cams 38 to turn in accord with the turning of the other cams 8 and thereby effect the lifting of the rear or free end of the supplemental frame simultaneously with the lifting of the front or hinged end of the said frame, as stated.

To brace the front runner, a series of transverse rods 39—39 are provided and each of the said rods has its opposite ends terminate in eyes for conveniently folding the opposite ends of the said brace rods to the opposite top members 10 of the runners.

One of the rods 39 is provided with a central aperture that serves to brace the rod on the central gear of the steering mechanism.

From the foregoing description, taken in connection with the accompanying drawings, the complete construction, the manner in which the parts are assembled for use and the advantages of my invention, it is believed, will be readily understood by those familiar with the construction and use of inventions in the line to which my invention belongs.

By reason of connecting the several parts that constitute my invention, as shown and described, a simple lever applied to the cam shaft 80 will quickly raise or lower the hinge frame, the adjustment of the power mechanism frame being automatically effected as the main frame is raised or lowered in the manner clearly understood, it being apparent that when raising the extreme free end of the hinge frame the said end of the frame is raised and lowered at a greater proportion of speed than the speed at its center or at its rear end and since the supplemental frame is hinged at its forward end to the hinge frame it follows that its rear or free end is automatically raised and lowered through the up and down motions of the side arms 7, their segmental racks and the spur gear connections.

In my construction of motor sleigh, when my propellers are properly running they make a threadway in the snow and ice, the helical flanges thereof always clearing themselves and preventing clogging.

If it is desired, a brake device may be used at the extreme end of the rear runners, which device consists of a pivoted brake lever 53 that is pivoted to the side of the rear runner with the upper end thereof projected through a slot in the rear end of the adjacent arm 3, means being provided for actuating the brake levers 53 from the supplemental or mechanism carrying frame. The brake mechanism just referred to may be omitted, if desired.

What I claim is:

1. In a motor sleigh, front and back runners, a main frame supported by the rear runners and upon which the front runner has a relatively rotary movement, means mounted upon the said frame for steering the front runner, a swinging frame that includes opposite side bars rigidly connected at their rear ends to the main frame to swing vertically with respect to the said main frame, a supplemental frame carried on the said swinging frame and adapted to swing vertically with respect to the said swinging frame, ground engaging propellers and a power mechanism in connection with the propellers supported upon the supplemental frame, and means for effecting simultaneous vertical adjustment of the swinging frame and the supplemental frame upon which the power mechanism and the propellers are supported.

2. In a motor sleigh, front and back runners, a main frame supported by the rear runner and upon which the front runner has a relatively rotary movement, means mounted on the main frame for effecting rotative movement of the front runner for steering, a supplemental frame carried on the main frame, a pair of longitudinally and oppositely disposed ground engaging propellers supported on the supplemental frame, connections that operatively join the propellers with the driving power mounted on the supplemental frame, and manually adjustable means for raising and lowering the supplemental frame that carries the propellers and the driving mechanism.

3. In a motor sleigh, front and back runners, frame bars rigidly mounted on the back runners and projected over the front runners operative connections for steering the front runners that joins the said front runners and the rigidly projected frame bars, a pair of oppositely disposed vertically swingable frame bars hingedly attached at their rear ends to the opposite sides of the rear runners, a supplemental frame supported by the last mentioned frame bars, driving and propelling mechanism mounted on the said supplemental frame, the supplemental frame being hingedly mounted at its front end relatively to the front end of the vertically swingable side bars, means for simultaneously raising and lowering the front and rear ends of the supplemental frame.

4. In a motor sleigh, front and back runners, frame bars rigidly mounted on the back runner and projected over the front runner, operative connections for steering the front runner that joins the said front runner and the rigidly projected frame bars, a supplemental frame supported by the rigid frame bars, driving and propelling mechanism mounted on the said supplemental frame, the said supplemental frame being hingedly mounted at its front end relatively to the front end of the main frame and means for simultaneously raising and lowering the front and rear ends of the supplemental frame.

5. In a motor sleigh of the character described, the combination with the opposite runners of a sled; of an anti-skid shoe for each runner, the said runners each having a longitudinal slot-way in which their respective shoes are received and are adapted for being projected below the tread face of the runner, each attached anti-skid shoe or member being pivotally joined at the front end to their respective runners, and a lifting rod attached to the rear end of each shoe for manipulating the shoes vertically through the runner body, the said rod being incased within the sled framing and having its upper end projected above the sled as set forth.

6. In a motor sleigh, the combination of a front and rear sled, a main frame comprising a pair of opposing side frames fixedly secured to the top of the opposite runners of the rear sled and projected forwardly over the front sled, operating connections for steering the front sled joined with the front sled and the projected ends of the side arms of the rigid frame, a second pair of opposite side frames hingedly connected to the rear sled and projected forwardly along the main frame side arms and joined by a front cross member, a supplemental frame that supports the motor, and propelling mechanism, said supplemental frame being hingedly connected to the front cross member of the aforesaid hinged arms, and means for elevating the hinged and supplemental frames and sustaining them at their vertical adjustments.

7. In a motor sleigh, the combination of a front and rear sled, a main frame comprising a pair of opposing side arms fixedly secured to the top of the opposite runners of the rear sled and projected forwardly over the front sled, operating connections for steering the front sled joined with the front sled and the projected ends of the side arms of the rigid frame, a second pair of opposite side frames hingedly connected to the rear sled and projected forwardly along the main frame side arms and joined by a front cross member, a supplemental frame that supports the motor and propelling mechanism, said supplemental frame being hingedly connected to the front cross member of the aforesaid hinged arms, means for elevating the hinged and supplemental frames and sustaining them at their vertical adjustments, the said means including a rotary cross shaft mounted on the main frame arms and cams on the shaft adapted for engaging the outer ends of the hinged arms.

8. In a motor sleigh, the combination of a front and a rear sled, a main frame comprising a pair of opposite side frames fixedly secured to the top of the opposite runners of the rear sled, and projected forwardly over the front sled, operative connections for steering the front sled joined with said front sled and the projected ends of the side arms of the main frame, a second pair of opposite side arms hingedly connected at their rear ends to the rear sled, a cross member that joins the front ends of the said second pair of side arms, a supplemental frame upon which the motor and the propelling mechanism is mounted, the said supplemental frame being hingedly connected to the front cross member that joins the front ends of the said second pair of side arms and means for elevating the hinged and supplemental frames and for sustaining them at their vertical adjustments.

9. A motor driven sleigh comprising a front and rear sled, side arms hingedly connected to the top of the runners of the rear sled and projected horizontally forward over the front sled, operative connections joined with the side frame arms and the front sled for steering the said front sled, a hinged frame that consists of a pair of oppositely disposed side arms, each of which is hinged to its respective side of the back sled to swing in the vertical plane, a supplemental frame including opposite side arms hingedly joined at the front ends to the front ends of the hinged arms, a motor, and propelling mechanism cooperative with the motor mounted upon the supplemental frame, a crank actuated shaft transversely journalled on the front ends of the main frame arms, cams on the front shaft upon which the front ends of the hinged arms rest, another shaft journalled across the main frame's side arms, cams on the said other shaft on which the rear ends of the side arms of the supplemental frame rest, a segment rack on each side frame, gears on the said other shaft that mesh with the aforesaid segment gears and adapted, as the hinged arms are raised under cam action on their return ends, to rotate the gear carrying shaft, cams on the last mentioned shaft that engage the side arms of the supplemental frame and adapted to raise the rear end of the said supplemental frame with its attached motor and propelling mechanism.

THOMAS RHOADES.